(12) United States Patent
Dai et al.

(10) Patent No.: US 10,686,378 B2
(45) Date of Patent: Jun. 16, 2020

(54) HIGH-EFFICIENCY REGULATED BUCK-BOOST CONVERTER

(71) Applicant: Futurewei Technologies, Inc., Plano, TX (US)

(72) Inventors: Heping Dai, Plano, TX (US); Liming Ye, Frisco, TX (US); Dianbo Fu, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/801,608

(22) Filed: Nov. 2, 2017

(65) Prior Publication Data

US 2018/0175732 A1    Jun. 21, 2018

Related U.S. Application Data

(60) Provisional application No. 62/435,402, filed on Dec. 16, 2016.

(51) Int. Cl.
| | |
|---|---|
| *H02M 3/158* | (2006.01) |
| *G05F 3/20* | (2006.01) |
| *H02M 3/07* | (2006.01) |
| *H02M 3/335* | (2006.01) |
| *H02M 1/00* | (2006.01) |

(52) U.S. Cl.
CPC .......... *H02M 3/1582* (2013.01); *G05F 3/205* (2013.01); *H02M 3/07* (2013.01); *H02M 3/33507* (2013.01); *H02M 2001/0048* (2013.01); *Y02B 70/1491* (2013.01)

(58) Field of Classification Search
CPC .......... H02M 3/155–1588; H02M 2001/0083; H02M 2001/0093
See application file for complete search history.

(56) References Cited

U.S. PATENT DOCUMENTS

| | | | | |
|---|---|---|---|---|
| 4,347,474 | A * | 8/1982 | Brooks | H02M 3/1582 |
| | | | | 323/222 |
| 5,859,632 | A * | 1/1999 | Ito | G09G 3/3622 |
| | | | | 345/211 |
| 5,943,224 | A * | 8/1999 | Mao | H02M 1/34 |
| | | | | 363/52 |
| 8,116,103 | B2 * | 2/2012 | Zacharias | H02M 7/48 |
| | | | | 363/132 |
| 9,318,968 | B2 * | 4/2016 | Lehn | H02M 3/155 |
| 9,740,225 | B1 * | 8/2017 | Wong | G05F 1/575 |
| 10,020,747 | B2 * | 7/2018 | Madsen | H02M 3/33546 |

(Continued)

*Primary Examiner* — Yusef A Ahmed
(74) *Attorney, Agent, or Firm* — Conley Rose, P.C.

(57) ABSTRACT

A regulated partial power controlled converter is presented, with the partial power controlled converter containing a DC/DC converter receiving an input signal. The regulated partial power converter providing a first converted signal from a first terminal, and providing a second converted signal from a second terminal. The regulated partial power converter also contains a first capacitor connected between an output node and an intermediate node, a second capacitor connected between the intermediate node and a ground, and a charge balance circuit connected to the output node, the intermediate node, and the ground. An output power of the partial power controlled converter is based on a first partial power provided by the DC/DC converter and a second partial power provided by a charge balance circuit.

19 Claims, 8 Drawing Sheets

(56) References Cited

U.S. PATENT DOCUMENTS

| | | | | |
|---|---|---|---|---|
| 2002/0125864 A1* | 9/2002 | Aiello | H02M 3/155 | 323/267 |
| 2005/0078491 A1* | 4/2005 | Song | H02M 3/33507 | 363/17 |
| 2007/0176576 A1* | 8/2007 | Potter | H02J 3/01 | 318/801 |
| 2007/0296383 A1* | 12/2007 | Xu | H02M 1/14 | 323/282 |
| 2008/0224652 A1* | 9/2008 | Zhu | H02J 7/35 | 320/101 |
| 2008/0239772 A1* | 10/2008 | Oraw | H02M 3/07 | 363/60 |
| 2008/0266919 A1* | 10/2008 | Mallwitz | H02M 3/158 | 363/124 |
| 2008/0278221 A1* | 11/2008 | Rowland | H02J 7/0016 | 327/536 |
| 2009/0168467 A1* | 7/2009 | Schmidt | H02M 3/155 | 363/34 |
| 2009/0278520 A1* | 11/2009 | Perreault | H02M 3/07 | 323/282 |
| 2011/0227418 A1* | 9/2011 | Pyboyina | H02J 9/062 | 307/75 |
| 2012/0008356 A1* | 1/2012 | Suntio | H02M 3/33507 | 363/131 |
| 2012/0044722 A1* | 2/2012 | Cuk | H02M 3/335 | 363/21.03 |
| 2012/0068756 A1* | 3/2012 | Aiello | H02M 7/483 | 327/333 |
| 2012/0153912 A1* | 6/2012 | Demski | H02M 3/07 | 323/282 |
| 2013/0020867 A1* | 1/2013 | Hughes | H02M 3/33507 | 307/17 |
| 2013/0057200 A1* | 3/2013 | Potts | H02M 3/33584 | 320/107 |
| 2013/0069614 A1* | 3/2013 | Tso | H02M 3/07 | 323/288 |
| 2013/0106342 A1* | 5/2013 | Iwata | H02M 7/30 | 320/101 |
| 2013/0121033 A1* | 5/2013 | Lehn | H02M 3/335 | 363/17 |
| 2013/0223103 A1* | 8/2013 | Pahlevaninezhad | H02M 3/337 | 363/17 |
| 2013/0223651 A1* | 8/2013 | Hoyerby | H03F 3/2173 | 381/120 |
| 2013/0336011 A1* | 12/2013 | Broussev | H02M 3/1588 | 363/16 |
| 2014/0001856 A1* | 1/2014 | Agamy | H02M 3/155 | 307/43 |
| 2014/0268946 A1* | 9/2014 | Liu | H02M 3/07 | 363/60 |
| 2015/0097492 A1* | 4/2015 | Ma | H05B 33/0815 | 315/186 |
| 2015/0115913 A1* | 4/2015 | Stewart | H02M 1/38 | 323/271 |
| 2015/0131330 A1* | 5/2015 | Pan | H02M 3/07 | 363/17 |
| 2015/0162840 A1* | 6/2015 | Frost | H02M 3/158 | 363/17 |
| 2016/0006365 A1* | 1/2016 | Perreault | H02M 1/4208 | 363/89 |
| 2016/0190943 A1* | 6/2016 | Chen | H02M 3/335 | 363/21.06 |
| 2016/0234901 A1* | 8/2016 | Delos Ayllon | H05B 33/0815 | |
| 2016/0344214 A1* | 11/2016 | Petersen | H02M 3/158 | |
| 2017/0005576 A1* | 1/2017 | Petersen | H02M 3/158 | |
| 2017/0019027 A1* | 1/2017 | Knobloch | H02M 1/44 | |
| 2017/0085189 A1* | 3/2017 | Madsen | H02M 3/33546 | |
| 2017/0099011 A1* | 4/2017 | Freeman | H02M 7/06 | |
| 2017/0201173 A1* | 7/2017 | Dicke | H02M 3/156 | |
| 2017/0237354 A1* | 8/2017 | Takahara | H02M 3/28 | 363/17 |
| 2017/0271983 A1* | 9/2017 | Breece, III | H02M 3/07 | |
| 2017/0310241 A1* | 10/2017 | Wu | H02M 7/25 | |
| 2018/0019669 A1* | 1/2018 | Zhang | H02M 3/073 | |
| 2018/0034359 A1* | 2/2018 | Chen | H02M 1/083 | |
| 2018/0183347 A1* | 6/2018 | Ye | H02M 3/33592 | |

* cited by examiner

HIGH-EFFICIENCY REGULATED BUCK-BOOST CONVERTER

CROSS-REFERENCE TO RELATED APPLICATIONS

This application claims priority to U.S. Provisional Application 62/435,402 filed on Dec. 16, 2016, entitled "High-Efficiency Regulated Buck-Boost Converter" which is hereby incorporated by reference as if reproduced in full.

STATEMENT REGARDING FEDERALLY SPONSORED RESEARCH OR DEVELOPMENT

Not applicable.

REFERENCE TO A MICROFICHE APPENDIX

Not applicable.

BACKGROUND

High efficiency power converters are used in many applications to reduce power losses and heating, as well as reduce the size of the power supplies. In telecommunication applications, a power converter may have a wide input voltage range, such as 36 volts (V) to 70 V. The power converter output may be load dependent and have a wide range, and vary from 20 V to 50 V for example. The power converter must be able to accommodate the input and output range, provide an accurate output voltage, and maintain high efficiency.

Thus, it is desirable to have a new power converter topology and method to overcome such issues.

SUMMARY

In order to achieve an efficient power converter with controllability and regulation, various partial power controlled converter embodiments with these characteristics are presented. The partial power converters are able to achieve an efficiency level of about 97%, while regulating the power input for additional control of varying input power. In one embodiment, the disclosure includes a regulated partial power controlled converter comprising a DC/DC converter receiving an input signal and providing a first converted signal from a first terminal, and providing a second converted signal from a second terminal; a first capacitor connected between an output node and an intermediate node; a second capacitor connected between the intermediate node and a ground; and a charge balance circuit (CBC) connected to the output node, the intermediate node, and the ground. An output power of the partial power controlled converter is based on a first partial power provided by the DC/DC converter and a second partial power provided by the CBC. The CBC maintains a predetermined voltage ratio across the first capacitor and the second capacitor.

In another embodiment, the disclosure includes a method of regulated power conversion in a regulated partial power controlled converter comprising receiving, by a DC/DC converter of the partial power converter, an input signal; providing, by the DC/DC converter, a first converted signal from a first terminal; providing, by the DC/DC converter, a second converted signal from a second terminal; maintaining, by a CBC, a predetermined voltage ratio across a first capacitor and a second capacitor, wherein the second capacitor is connected between an intermediate node and a ground, wherein the first capacitor is connected between an output node and the intermediate node, and wherein the CBC is connected to the output node, the intermediate node, and the ground; providing a first partial power provided by the DC/DC converter; and providing a second partial power provided by the CBC. An output power of the partial power controlled converter is based on the first partial power and the second partial power.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments of partial power converters operating over a wide range of input and regulated output voltage, while maintaining high overall efficiency. The semi-partial controlled method is proposed to solve known issues by using a voltage balance circuit and partial power controlled converter such as buck-boost or flyback converters. The partial power is processed by a DC/DC converter such as buck-boost or flyback converter, while the rest of the power is processed by the voltage balancing circuit, which usually has much higher efficiency than the DC/DC converter. The advantage is fully controlled regulation so transient responses will be faster than other partial power controlled topologies. It can also achieve higher efficiency than traditional DC/DC converters, and over wide input and output voltage ranges.

Figure 1:
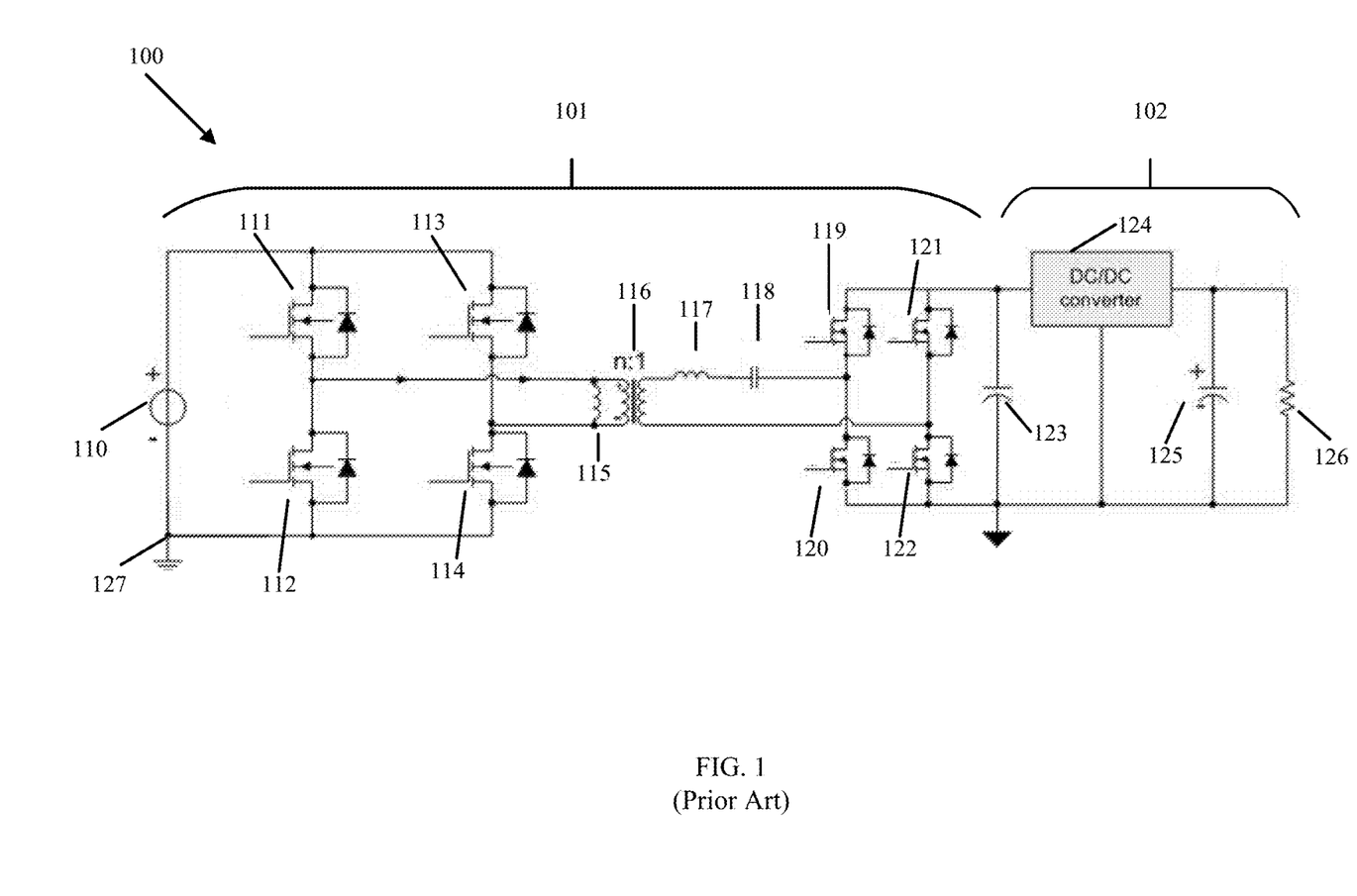
FIG. 1 is a schematic diagram of a art two-stage resonant power converter.

FIG. 1 illustrates a architecture of a two-stage resonant power converter 100 that may be used to regulate/control power for electronic equipment, such as telecommunication equipment. The power converter 100 comprises a resonant converter stage 101 that is open loop or close to unregulated to achieve the highest efficiency. A direct current (DC)/DC converter stage 102 follows the resonant converter stage 101 to regulate the output. The resonant converter stage 101 comprises a voltage source 110 connected to a ground 127, a first transistor switch 111, a second transistor switch 112, a third transistor switch 113, and a fourth transistor switch 114. The transistor switches 111, 112, 113, 114 are controlled to provide a current to a transformer 116. The resonant converter stage 101 further comprises an inductor 115 on a primary side of the transformer 116 having coil ratio of n:1, and an inductor 117 and a capacitor 118 in series on a secondary side of the transformer 116. The secondary side also includes a fifth transistor switch 119, a sixth transistor switch 120, a seventh transistor switch 121, and an eighth transistor switch 122. The DC/DC converter stage 102 comprises a capacitor 123, a DC/DC converter 124, and a capacitor 125 in a parallel with resistor 126, where an output voltage is measured across the capacitor 125 and the resistor 126.

The resonant converter stage 101 may have 99% efficiency, the DC/DC converter stage 102 may have 97% efficiency, and the power converter 100 may have an overall efficiency of 96%. In order to achieve high efficiency of the resonant converter stage 101, the power converter 100 has a fixed duty cycle. The result of the first stage is a very efficient converter but there is no control for adjusting to changes to the input voltage. Any changes to the input voltage affect the output voltage of the resonant converter stage 101. The DC/DC converter stage 102 provides regulation for the power converter 100 but with an accompanying lower efficiency. In some embodiments, the DC/DC converter stage 102 can also be in front of the resonant converter stage 101. However, the transient response time, especially to load, may be slower due to the resonant converter response delay. The DC/DC converter stage 102 also needs feedback isolation from the output for regulation in such embodiments.

Figure 2A:
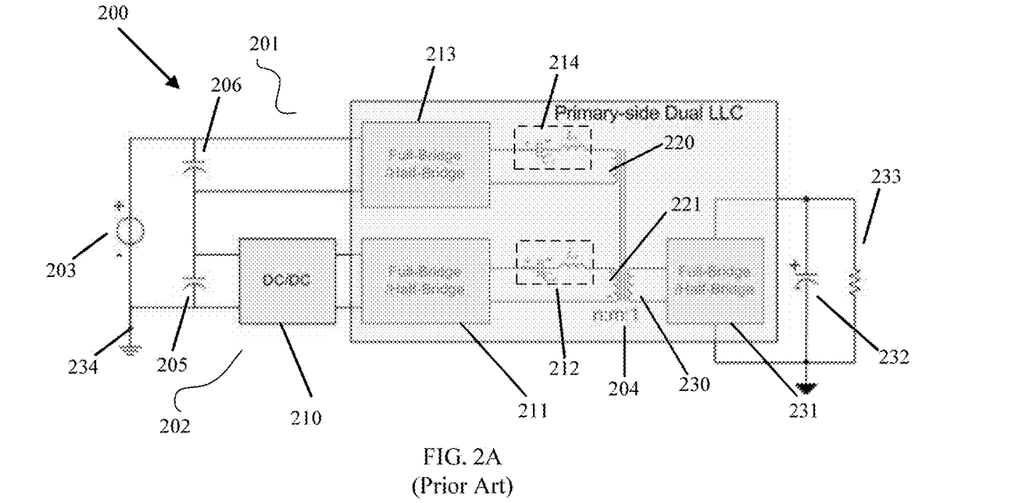
FIGS. 2A-2B are schematic diagrams of parallel partial power controlled converters.

In other power converters, a partial power controlled method can increase the efficiency because part of the input power can be delivered to output directly without a power conversion process. There are many partial power controlled topologies available, however the known topologies have issues with isolation requirements and controllability. FIG. 2A illustrates a typical architecture of a partial power controlled primary side converter 200 comprising an unregulated open-loop partial stage 201 and a regulated partial stage 202.

An input voltage source 203 is connected to a ground 234 and delivers power to a transformer 204 through two routes. The starting point of the first route is at a first input capacitor 205. The first route includes the DC/DC converter 210, a first rectifier 211 and a first resonant tank 212. The first resonant tank 212 comprises an inductor and a capacitor in series, and may also be referred to as a resonant circuit. The starting point of the second route is at a second input capacitor 206. The second route includes a second rectifier 213 and a second resonant tank 214 comprising an inductor and a capacitor in series. The first input capacitor 205 and the second input capacitor 206 are connected in series and further coupled between the positive and negative terminals of the input voltage source 203. The partial power controlled primary side converter 200 comprises two primary side windings, namely a first primary side winding 220 and a second primary side winding 221. The secondary side of the partial power controlled primary side converter 200 includes a secondary side winding 230, a third rectifier 231, and an output across an output capacitor 232 and a resistive load 233. The rectifiers 211, 213, 231 may be full-bridge or half-bridge rectifiers.

The open-loop partial stage 201 passes the input voltage power from the input voltage source 203 through the second rectifier 213 before going directly through the first primary side winding 220 to the secondary side winding 230. The power passing through the regulated partial stage 202 passes through the DC/DC converter 210 and the first rectifier 211 before going across the transformer 204 to the secondary side winding 230. The open-loop partial stage 201 has 98% efficiency, and the regulated partial stage 202 is two-stages and achieves 96% efficiency. Overall, the partial power controlled primary side converter 200 has 97% efficiency and thus is better than a pure two-stage converter, such as the power converter of FIG. 1. However, the partial power controlled primary side converter 200 does not have the ability to handle an inrush or surge (abrupt dynamic power or voltage transients) of input power because the open-loop partial stage 201 passes the power without regulation. Any power surge will pass through the power converter before adjustments could be made.

Figure 2B:
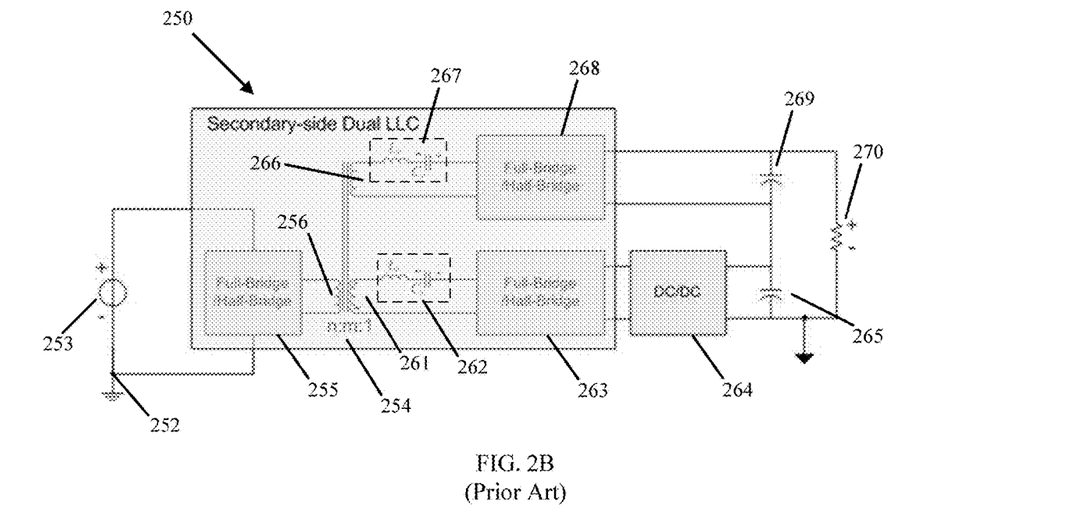

FIG. 2B illustrates a partial power controlled secondary side converter 250, which is similar to the partial power controlled primary side converter 200. An input voltage source 253 is connected to a ground 252 and delivers power to the transformer 254 through two routes. The first route includes a first rectifier 255 coupled to a primary side winding 256 of the transformer 254, which is electrically coupled to a first secondary side winding 261, a first resonant tank 262, and a second rectifier 263. The first route finishes through a DC/DC converter 264 and a first output capacitor 265. The second route includes the primary side winding 256 electrically coupled to a second secondary side winding 266, a second resonant tank 267, a third rectifier 268, and finishing through a second output capacitor 269. The rectifiers 255, 263, 268 may be full-bridge or half-bridge rectifiers. The first and second output capacitors 265, 269 are connected in series, and an output is provided across a resistive load 270. The partial power controlled secondary side converter 250 has the two partial stages on the secondary side of the power converter, but operates and has similar issues as the partial power controlled primary side converter 200.

Embodiment 1—Non-Isolated Partial Power Controlled Converter

Figure 3A:
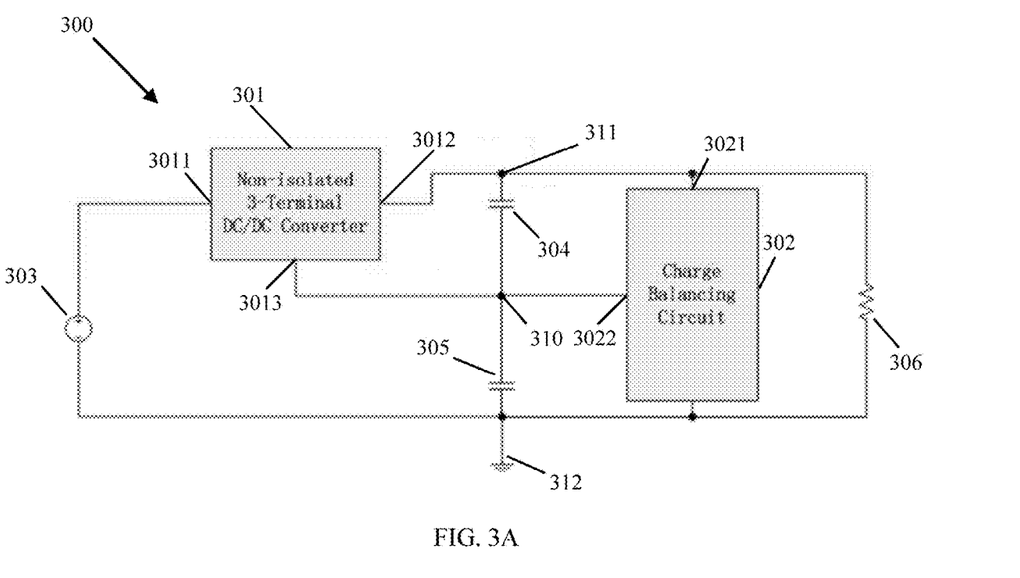
FIG. 3A is a schematic diagram of a non-isolated partial power controlled converter in accordance with various embodiments of the present disclosure.

FIG. 3A shows a block diagram of a non-isolated partial power controlled converter 300 comprising an input power supply 303 connected to a ground 312 and providing an input voltage to a non-isolated 3-terminal DC/DC converter 301, a first capacitor 304, a second capacitor 305, a charge balancing circuit (CBC) 302, and a resistive load 306. An input terminal 3011 of the DC/DC converter 301 receives an input signal from the input power supply 303, provides a first converted signal from a first terminal 3012 to an output node 311, and provides a second converted signal from a second terminal 3013 to an intermediate node 310. The first capacitor 304 is connected between the output node 311 and the intermediate node 310. The second capacitor 305 is connected between the intermediate node 310 and the ground 312. The CBC 302 is connected to the output node 311, the intermediate node 310, and the ground 312, where the CBC 302 maintains a predetermined voltage ratio across the first capacitor 304 and the second capacitor 305. In operation, the DC/DC converter 301 can be a buck-boost converter and provide voltage output control for the partial power controlled converter 300. The DC/DC converter 301 can provide a first partial power from the first terminal 3012 to the output node 311, and provide power for a second partial power from the second terminal 3013 at the intermediate node 310.

The power for a second partial power at the output node 311 is part of a second path through DC/DC converter 301 to the intermediate node 310 and then through the CBC 302. The CBC 302 provides partial power through an output connection 3021 to the output node 311. The output power of the partial power controlled converter 300 is supplied from both the DC/DC converter 301 and the CBC 302. In various embodiments, the CBC 302 is a regulated step-down converter, such as charge pump, and may be very high efficiency for the power transfer. For example, the CBC 302 can have an efficiency of at least 98%.

In accordance with various embodiments, partial power is processed by the DC/DC converter 301, while the CBC 302 transfers the remaining power in a highly efficient manner. When the average current in capacitors 304, 305 is zero, the percentage of power transferred from the input of the partial power controlled converter 300 at the input terminal 3011 of the DC/DC converter 301 to the output of the partial power controlled converter 300 by the CBC 302 is (Vout−Vx)/Vout, where Vout is the output voltage at the output node 311 and measured across the resistive load 306, and Vx is the voltage at the intermediate node 310. In a preferred embodiment Vx=½ Vout, and the CBC transfers 50% of the power from the input to the output of the partial power controlled converter 300. If Vx=9/10 Vout, then the partial power processed by the DC/DC converter 301 will be about 10%. In various embodiments, the voltage Vx is controlled by the CBC 302, which has a direct impact on the overall efficiency of the partial power controlled converter 300.

In various embodiments, the DC/DC converter 301 handles power surges that may occur at the converter input as well. Further, since the DC/DC converter 301 has an efficiency of about 96% and the CBC 302 has an efficiency of about 98%, the overall efficiency of the partial power controlled converter 300 is a very high 97%. Furthermore, the partial power controlled converter 300 can be efficiently designed because the DC/DC converter 301 only has to be designed to handle the voltage range difference of the two terminals (i.e., voltage at the output node 311 and the voltage at the intermediate node 310). Since the voltage at the intermediate node 310 is greater than zero, the voltage range for the DC/DC converter 301 is Vout-Vx, instead of Vout for a typical converter connected directly to the ground 312. A secondary benefit is the option to use high quality components for more efficient power conversion due to not over-designed circuit requirements.

Figure 3B:
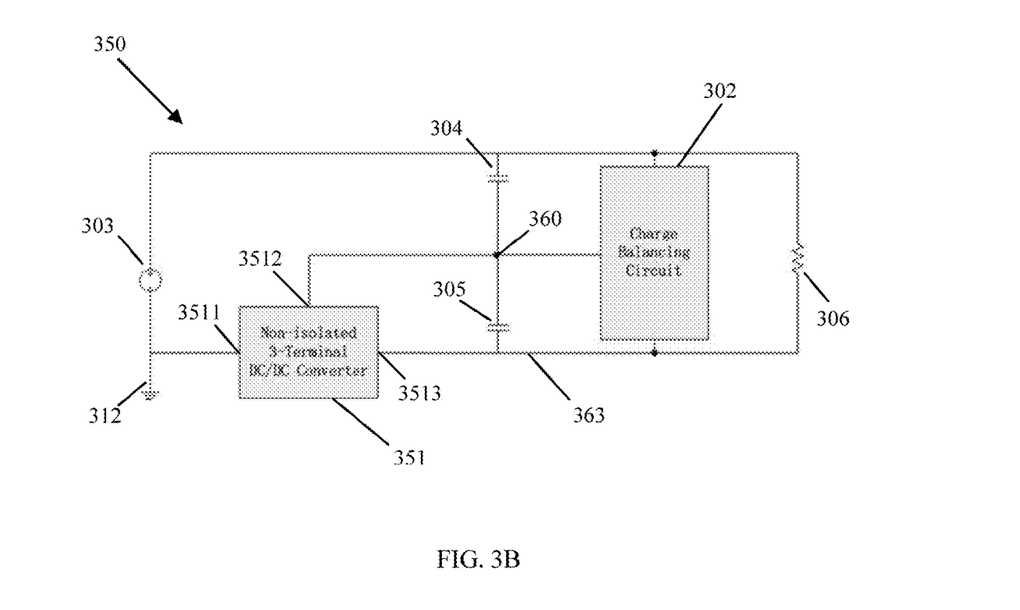
FIG. 3B is a schematic diagram of a non-isolated partial power controlled converter in accordance with other various embodiments of the present disclosure.

FIG. 3B shows a non-isolated partial power controlled converter 350 similar to the partial power controlled converter 300 of FIG. 3A. The partial power controlled converter 350 comprises a 3-terminal DC/DC converter 351, which connects to a ground 312 as an input at a first terminal 3511, rather than an input voltage provided by an input power supply 303. The other two terminals 3512, 3513 of DC/DC converter 351 are connected to an intermediate node 360 and a floating ground 363, respectively. The remaining circuit components in the partial power controlled converter 350 are the same as the partial power controlled converter 300 of FIG. 3A, and include the CBC 302, the first capacitor 304, the second capacitor 305, and the resistive load 306.

Embodiment 2—Isolated Partial Power Controlled Converter

Figure 4A:
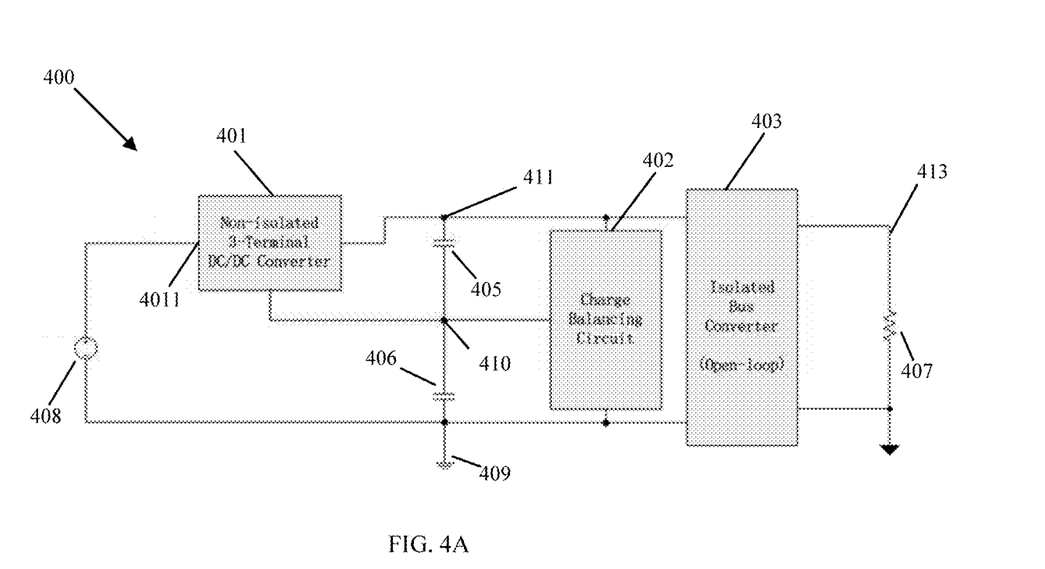
FIG. 4A is a schematic diagram of an isolated partial power controlled converter in accordance with various embodiments of the present disclosure.

FIG. 4A is a schematic of an isolated partial power controlled converter 400, which is similar to the non-isolated partial power controlled converter 300 and includes an isolated bus converter 403 to isolate the converter output from the converter input. The isolated bus converter 403 reduces the overall efficiency of the partial power controlled converter 400, but provides the benefit of having an isolated converter.

In accordance with various embodiments and with reference to FIG. 4A, an isolated partial power controlled converter 400 comprises a non-isolated 3-terminal DC/DC converter 401, a first capacitor 405 and a second capacitor 406, a CBC 402, an isolated bus converter (IBC) 403, a resistive load 407, and an input voltage source 408. The partial power controlled converter 400 receives an input voltage from the input voltage source 408, and provides an output voltage to an output node 413 across the resistive load 407. The partial power conversion paths and processes are the same as those discussed with reference to FIG. 3A. In operation, the 3-terminal DC/DC converter 401 receives the input voltage from the input voltage source 408 at a first terminal 4011. The DC/DC converter 401 provides voltage output control for the power converter 400 and outputs a first signal to a top node 411 and a second signal to an intermediate node 410. The first capacitor 405 is connected between the top node 411 and the intermediate node 410, and the second capacitor 406 is connected between the intermediate node 410 and a ground 409. The converter power provided to the top node 411 from the DC/DC converter 401 and the CBC 402 is transferred across the IBC 403 to the output node 413.

The IBC 403 is an open-loop device that provides the output voltage and has an input voltage at the top node 411. The IBC 403 receives the input voltage, and steps down the voltage to provide the output voltage at the output node 413. The provided step-down is a set ratio and not regulated. Since the voltage at the top node 411 is regulated by the DC/DC converter 401 and the CBC 402, the IBC 403 is designed for a narrow input voltage range and can thus be efficiently designed. For example, the IBC 403 can have a 98% load efficiency in various embodiments.

Figure 4B:
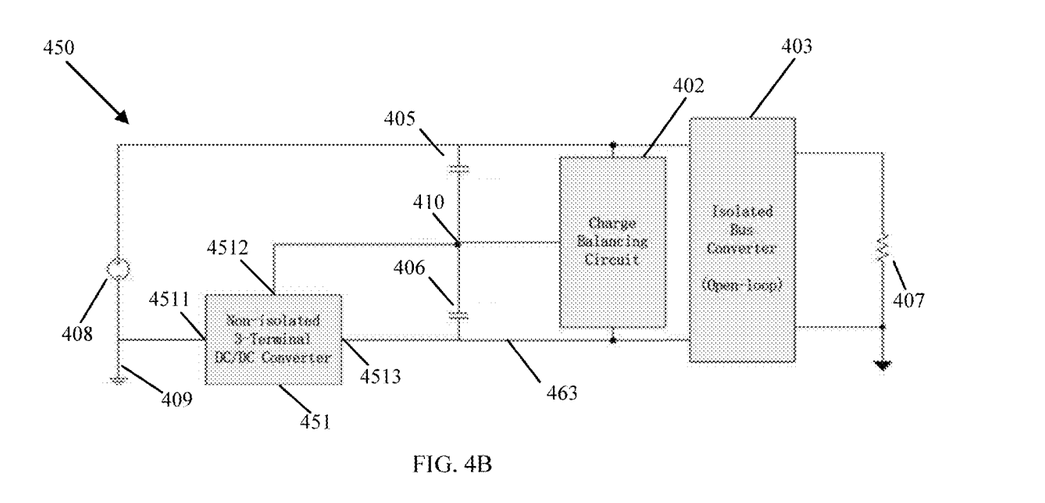
FIG. 4B is a schematic diagram of an isolated partial power controlled converter in accordance with other various embodiments of the present disclosure.

Likewise, FIG. 4B is a schematic of an isolated partial power controlled converter 450 similar to the non-isolated partial power controlled converter 350. The partial power controlled converter 450 comprises a 3-terminal DC/DC converter 451, which connects to a ground 409 as an input at a first terminal 4511, rather than an input voltage from an input voltage source 408. The other two terminals 4512, 4513 of DC/DC converter 451 are connected to the intermediate node 410 and a floating ground 463, respectively. The remaining circuit components in the isolated partial power controlled converter 450 are same as the isolated partial power controlled converter 400 of FIG. 4A, and include the first capacitor 405, the second capacitor 406, the CBC 402, the IBC 403, and the resistive load 407.

Figure 5A:
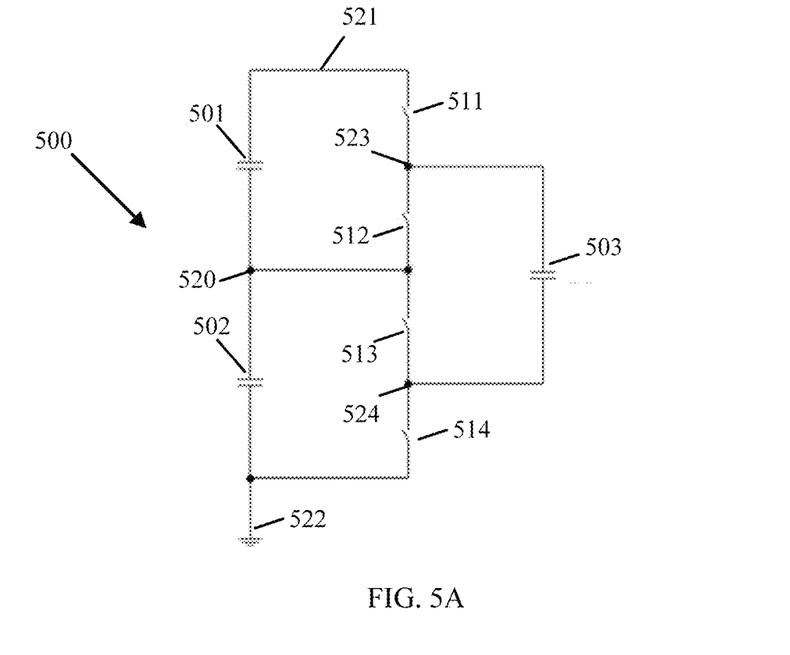
FIG. 5A is a schematic diagram of an exemplary charge balancing circuit in accordance with various embodiments of the present disclosure.

In accordance with various embodiments and with reference to FIG. 5A, a CBC 500, which can be the CBC implemented as CBC 302 and CBC 402 in the previous embodiments of partial power converters. The CBC 500 comprises four conductive switches/transistors: first switch 511, second switch 512, third switch 513, and fourth switch 514. Further, a first capacitor 501 is connected in parallel with the first switch 511 and the second switch 512. A second capacitor 502 is connected in parallel with the third switch 513 and the fourth switch 514, and in series with the first capacitor 501. Furthermore, the CBC 500 comprises a third capacitor 503, which acts as a pumping capacitor and is connected at a first node 523 between the first switch 511 and the second switch 512, and at a second node 524 between the third switch 513 and the fourth switch 514. The CBC 500 balances the voltage ratio of the first capacitor 501 and the second capacitor 502 to a desired ratio cycle-by-cycle in order for partial power regulation balancing to be maintained. In various embodiments, the CBC 500 comprises a charge pump voltage converter. Further, in various embodiments the capacitance of the first capacitor 501 is the same as the capacitance of the second capacitor 502, and the voltage across the first capacitor 501 is set equal to the voltage across the second capacitor 502.

In accordance with various embodiments, an output voltage is provided at an intermediate node 520 between the second switch 512 and the third switch 513, which is also the intermediate node 520 for capacitors 501, 502, and forms a capacitive voltage divider. The switches are turned ON/OFF to drive a voltage at the intermediate node 520, and charge/discharge the first capacitor 501 and the second capacitor 502. The first switch 511 is connected to a top node 521 and the fourth switch 514 is connected to a ground 522. In a first position, the second switch 512 and the fourth switch 514 are switched ON, and the first switch 511 and the third switch 513 are switched OFF. In a second position, the first switch 511 and the third switch 513 are switched ON, and the second switch 512 and the fourth switch 514 are switched OFF. The switching positions generate two separate conductive paths across the CBC 500, each of which includes a connection of the third capacitor 503, placing the third capacitor 503 alternately in parallel with the first capacitor 501 (when switches 511, 513 are ON and switches 512, 514 are OFF) and the second capacitor 502 (when switches 511, 513 are OFF and switches 512, 514 are ON).

In accordance with various embodiments, the CBC 500 is controlled by alternately opening and closing switch pairs 511, 513 and switch pairs 512, 514 at a set frequency. When switches 511, 513 are closed and switches 512, 514 are open, the third capacitor 503 is parallel to the first capacitor 501, and the third capacitor 503 is charged to a voltage difference between the voltage of the top node 521 and the voltage of the intermediate node 520. The parallel capacitors 501, 503 are in series with the second capacitor 502. Conversely, when switches 511, 513 are open and switches 512, 514 are closed, the third capacitor 503 is charged to the voltage at the intermediate node 520, and the third capacitor 503 is parallel to the second capacitor 502. The first capacitor 501 is in series with parallel capacitors 502, 503. The switches 511, 512, 513, 514 are controlled such that the third capacitor 503 is used to balance the voltage ratio between the first capacitor 501 and the second capacitor 502 to a desired ratio on a cycle-by-cycle basis so that partial power regulation can be maintained. Highest efficiency of the CBC 500 may be achieved when the voltage at the intermediate node 520 is half the voltage at the top node 521, the capacitance of the first capacitor 501 is equal to the capacitance of the second capacitor 502, and the switching occurs at a 50% duty cycle.

Figure 5B:
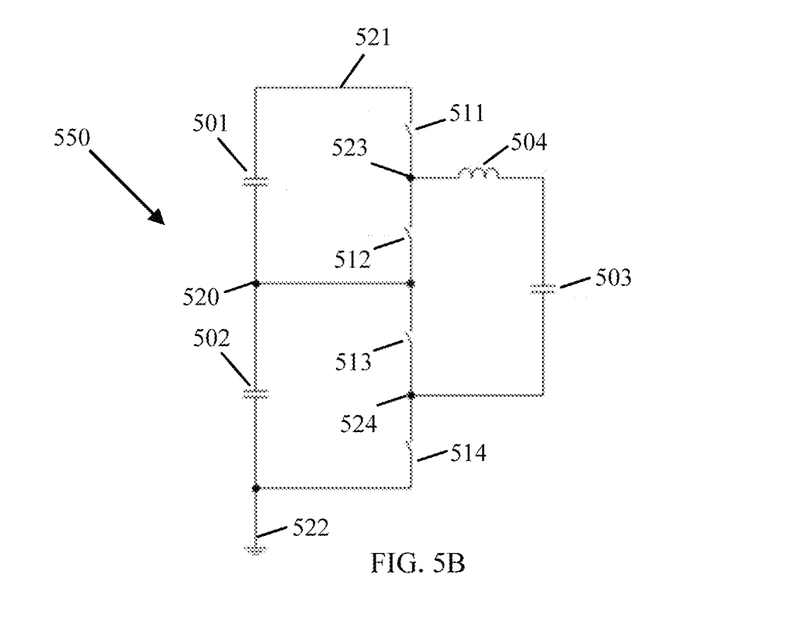
FIG. 5B is a schematic diagram of another exemplary charge balancing circuit in accordance with various embodiments of the present disclosure.

FIG. 5B illustrates a CBC 550, which can be the CBC implemented as CBC 302 and CBC 402 in the previous embodiments of partial power converters. The CBC 550 is the same as the CBC 500, and further includes an inductor 504 in series with the third capacitor 503. The inductor 504 smooths the outputs and any power spikes that the CBC 550 may encounter. The CBC 550 comprises four conductive switches/transistors: first switch 511, second switch 512, third switch 513, and fourth switch 514. Further, a first capacitor 501 is connected in parallel with the first switch 511 and the second switch 512. A second capacitor 502 is connected in parallel with the third switch 513 and the fourth switch 514, and in series with the first capacitor 501. Furthermore, the CBC 500 comprises a third capacitor 503 in series with the inductor 504, which acts as a pumping capacitor and is connected at a first node 523 between the first switch 511 and the second switch 512, and at a second node 524 between the third switch 513 and the fourth switch 514. The CBC 550 balances the voltage ratio of the first capacitor 501 and the second capacitor 502 to a desired ratio cycle-by-cycle in order for partial power regulation balancing to be maintained. In various embodiments, the CBC 550 comprises a charge pump voltage converter. Further, in various embodiments the capacitance of the first capacitor 501 is the same as the capacitance of the second capacitor 502, and the voltage across the first capacitor 501 is set equal to the voltage across the second capacitor 502.

In accordance with various embodiments, an output voltage is provided at an intermediate node 520 between the second switch 512 and the third switch 513, which is also the intermediate node 520 for capacitors 501, 502, and forms a capacitive voltage divider. The switches are turned ON/OFF to drive a voltage at the intermediate node 520, and charge/discharge the first capacitor 501 and the second capacitor 502. The first switch 511 is connected to a top node 521 and the fourth switch 514 is connected to a ground 522. In a first position, the second switch 512 and the fourth switch 514 are switched ON, and the first switch 511 and the third switch 513 are switched OFF. In a second position, the first switch 511 and the third switch 513 are switched ON, and the second switch 512 and the fourth switch 514 are switched OFF. The switching positions generate two separate conductive paths across the CBC 550, each of which includes a connection of the third capacitor 503, placing the third capacitor 503 alternately in parallel with the first capacitor 501 (when switches 511, 513 are ON and switches 512, 514 are OFF) and the second capacitor 502 (when switches 511, 513 are OFF and switches 512, 514 are ON).

In accordance with various embodiments, the CBC 550 is controlled by alternately opening and closing switch pairs 511, 513 and switch pairs 512, 514 at a set frequency. When switches 511, 513 are closed and switches 512, 514 are open, the third capacitor 503 and the inductor 504 are parallel to the first capacitor 501, and the third capacitor 503 is charged to a voltage difference between the voltage of the top node 521 and the voltage of the intermediate node 520. The parallel capacitors 501, 503 are in series with the second capacitor 502. Conversely, when switches 511, 513 are open and switches 512, 514 are closed, the third capacitor 503 is charged to the voltage at the intermediate node 520, and the third capacitor 503 and the inductor 504 are parallel to the second capacitor 502. The first capacitor 501 is in series with parallel capacitors 502, 503. The switches 511, 512, 513, 514 are controlled such that the third capacitor 503 is used to balance the voltage ratio between the first capacitor 501 and the second capacitor 502 to a desired ratio on a cycle-by-cycle basis so that partial power regulation can be maintained. Highest efficiency of the CBC 550 may be achieved when the voltage at the intermediate node 520 is half the voltage at the top node 521, the capacitance of the first capacitor 501 is equal to the capacitance of the second capacitor 502, and the switching occurs at a 50% duty cycle. Moreover, in addition to the two examples described above, other possible circuits may be used to balance the ratio of the first capacitor 501 voltage to the second capacitor 502 voltage as would be understood by one skilled in the art.

Figure 6A:
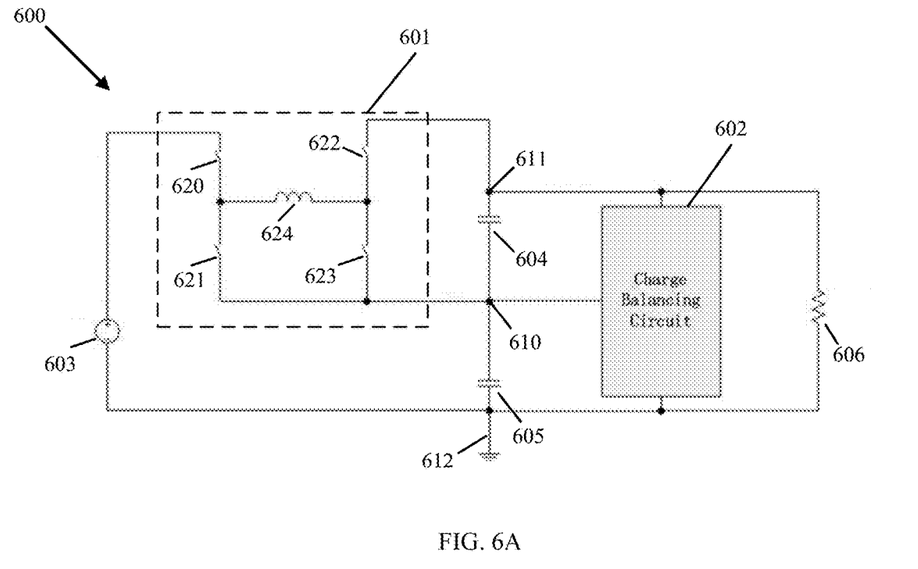
FIG. 6A is a schematic diagram of a buck-boost converter in a non-isolated partial power controlled converter in accordance with various embodiments of the present disclosure.

FIG. 6A illustrates a non-isolated partial power controlled converter 600, which is similar to the partial power controlled converter 300 and provides additional detail of a basic buck-boost converter 601 as the DC/DC converter, which is connected to a CBC 602. The CBC 602, which can be the CBC implemented as CBC 302, CBC 402, CBC 500, and CBC 550 in the previous embodiments. The non-isolated partial power controlled converter 600 comprises an input power supply 603 connected to a ground 612 and providing an input voltage to a buck-boost converter 601, a first capacitor 604, a second capacitor 605, a CBC 602, and a resistive load 606. The buck-boost converter 601 comprises a first switch 620, a second switch 621, a third switch 622, a fourth switch 623, and an inductor 624. The buck-boost converter 601 is constructed from two converter topologies: a step-down (buck) converter and a step-up (boost) converter. This converter topology is employed in regulated DC power supplies for which an output voltage can be higher or lower than an input voltage. The first switch 620 of the buck-boost converter 601 receives an input signal from the input power supply 603. The first capacitor 604 is connected between the output node 611 and the intermediate node 610. The second capacitor 605 is connected between the intermediate node 610 and the ground 612. The CBC 602 is connected to the output node 611, the intermediate node 610, and the ground 612, where the CBC 602 maintains a predetermined voltage ratio across the first capacitor 604 and the second capacitor 605.

In operation of the buck-boost converter 601, the ON/OFF states of the switches 620, 621, 622, 623 are controlled with a pulse-width modulation (PWM) controller (not shown). In a first cycle, switches 620, 623 are turned ON, i.e., conducting, and switches 621, 622 are turned OFF, i.e., non-conducting. The inductor 624 is charged and stores a current. In a second cycle, switches 620, 623 are turned OFF, i.e., non-conducting, and switches 621, 622 are turned ON, i.e., conducting. The inductor current flows through the switches 621, 622, transferring some of the energy stored in the inductor 624 to a load. In various embodiments, the second switch 621 and the third switch 622 can be Schottky diodes.

Figure 6B:
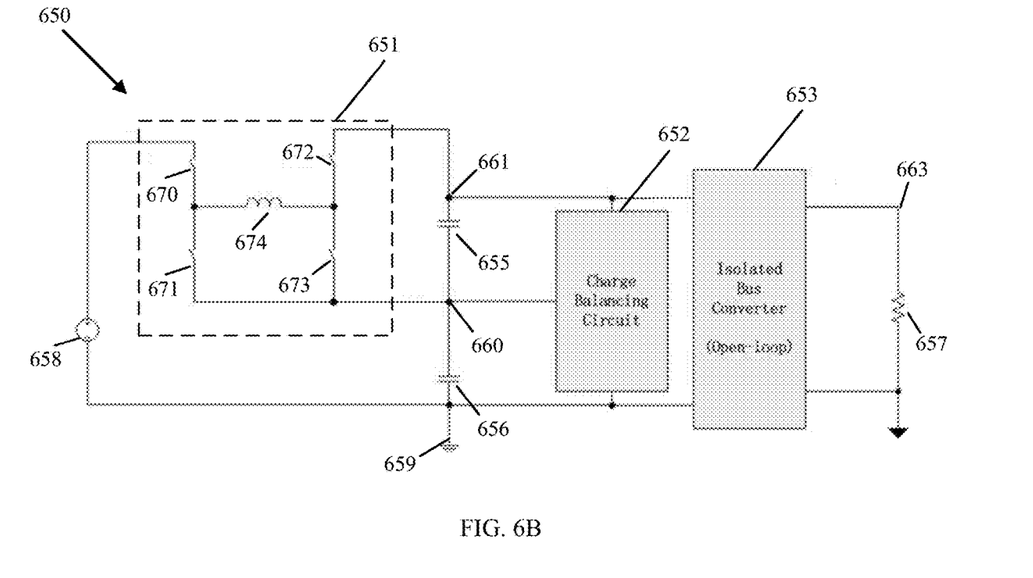
FIG. 6B is a schematic diagram of a buck-boost converter in an isolated partial power controlled converter in accordance with various embodiments of the present disclosure.

FIG. 6B is a schematic of an isolated partial power controlled converter 650, which is similar to the partial power controlled converter 400, and provides additional detail of a basic buck-boost converter 651 as the DC/DC converter. The isolated partial power controlled converter 650 comprises the buck-boost converter 651, a first capacitor 655 and a second capacitor 656, a CBC 652, an IBC 653, a resistive load 657, and an input voltage source 658. The buck-boost converter 651 comprises a first switch 670, a second switch 671, a third switch 672, a fourth switch 673, and an inductor 674. The partial power controlled converter 650 receives an input voltage from the input voltage source 658, and provides an output voltage to an output node 663 across the resistive load 657. The partial power conversion paths and processes are the same as those discussed with reference to FIG. 3A. In operation, the buck-boost converter 651 receives the input voltage from the input voltage source 658 at the first switch 670. The buck-boost converter 651 provides voltage output control for the power converter 650 and outputs a first signal to a top node 661 and a second signal to an intermediate node 660. The first capacitor 655 is connected between the top node 661 and the intermediate node 660, and the second capacitor 656 is connected between the intermediate node 660 and a ground 659. The converter power provided to the top node 661 from the buck-boost converter 651 and the CBC 652 is transferred across the IBC 653 to the output node 663. The IBC 653 provides isolation and can be the IBC implemented as 403 in the previous embodiment. Similarly, the CBC 652 can be the CBC implemented as CBC 302, CBC 402, CBC 500, and CBC 550 in the previous embodiments.

The buck-boost converter 651 is constructed from two converter topologies: a step-down (buck) converter and a step-up (boost) converter. This converter topology is employed in regulated DC power supplies for which an output voltage can be higher or lower than an input voltage. In operation of the buck-boost converter 651, the ON/OFF states of the switches 670, 671, 672, 673 are controlled with a PWM controller (not shown). In a first cycle, switches 670, 673 are turned ON, i.e., conducting, and switches 671, 672 are turned OFF, i.e., non-conducting. The inductor 674 is charged and stores a current. In a second cycle, switches 670, 673 are turned OFF, i.e., non-conducting, and switches 671, 672 are turned ON, i.e., conducting. The inductor current flows through the switches 671, 672, transferring some of the energy stored in the inductor 674 to a load. In various embodiments, the second switch 671 and the third switch 672 can be Schottky diodes.

Figure 7:
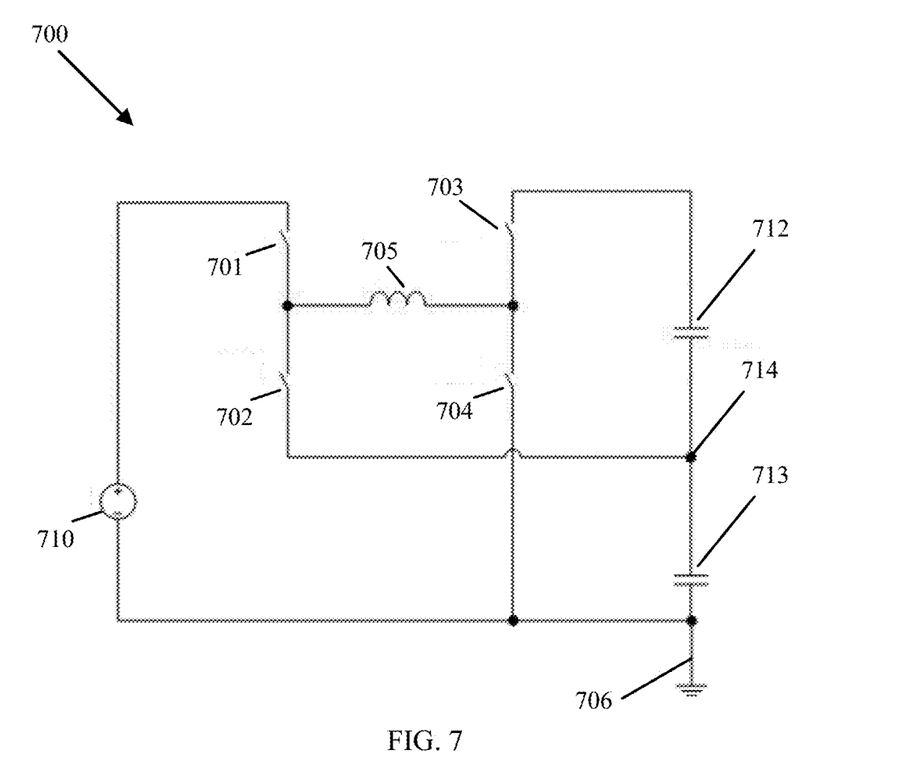
FIG. 7 is a schematic diagram of a wide range buck-boost partial power controlled converter in accordance with various embodiments of the present disclosure.

FIG. 7 illustrates a wide range buck-boost converter 700, which is similar to the buck-boost converter 601 of FIG. 6A. The buck-boost converter 700 comprises a first switch 701, a second switch 702, a third switch 703, a fourth switch 704, and an inductor 705. The buck-boost converter 700 receives an input power from an input power supply 710. The third switch 703 is connected to a first capacitor 712. The second switch 702 is connected to an intermediate node 714 between the first capacitor 712 and a second capacitor 713. The difference between the buck-boost converter 601 and the buck-boost converter 700 is that the fourth switch 704 is connected between the inductor 705 and a ground 706, rather than the inductor 705 and the intermediate node 714. The buck-boost converter 700 may be implemented in the partial power converters 300, 350, 400, 450 as described above when an input voltage is low but still greater than a voltage at an intermediate node.

Figure 8:
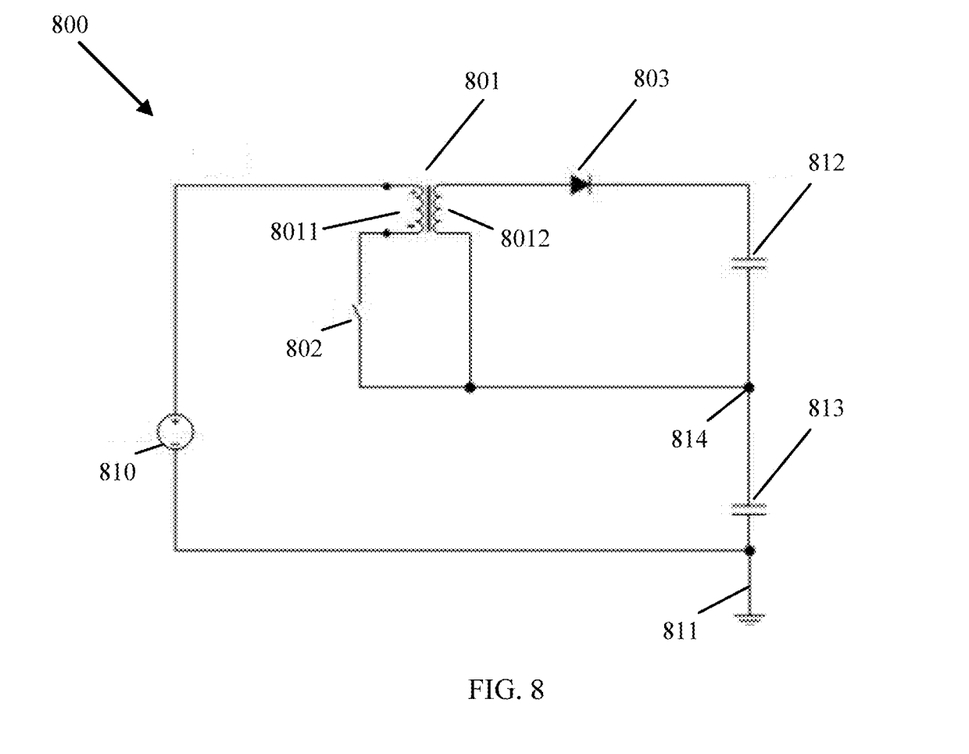
FIG. 8 is a schematic diagram of a flyback partial power controlled converter in accordance with various embodiments of the present disclosure.

FIG. 8 illustrates a flyback partial power controlled converter 800, which may be implemented as a DC/DC converter in the partial power converters 300, 350, 400, 450 as described above instead of a conventional buck-boost converter. The flyback partial power controlled converter 800 is less efficient than a conventional buck-boost converter but is typically less expensive as well. Further, flyback converter 800 has only one or two switches and is therefore easier to control compared to a 4-switch buck-boost converter. The flyback partial power controlled converter 800 comprises a transformer 801, a first switch 802, and a diode 803. In an alternative embodiment, the diode 803 is replaced with a second switch, such as a transistor. An input voltage from an input power supply 810 is provided to a primary-side winding 8011 of the transformer 801. When the first switch 802 is turned ON, i.e., conducting, current flows into the primary-side winding 8011 of the transformer 801 and is stored. When the first switch 802 is turned OFF, i.e., non-conducting, the stored energy is output through the diode 803 from a secondary-side winding 8012 of the transformer 801. In various embodiments, the diode 803 is connected between the secondary-side winding 8012 of the transformer 801 and a first capacitor 812. Further, the first switch 802 is connected between the primary-side winding 8011 of the transformer 801 and an intermediate node 814, where the intermediate node 814 is located between the first capacitor 812 and a second capacitor 813. Both the second capacitor 813 and the input power supply 810 are connected to a ground 811.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A regulated partial power controlled converter, comprising:
    a direct current (DC)/DC converter configured to receive an input signal, to provide a first converted signal over a first path from a first terminal to an output node, and to provide a second converted signal over a second path from a second terminal to an intermediate node, the first path being independent of the second path, and the first converted signal different than the input signal;
    a first capacitor connected between the output node and the intermediate node;
    a second capacitor connected to the intermediate node and directly connected to a ground; and
    a charge balance circuit (CBC) connected to the output node, the intermediate node, and the ground, the CBC comprising a regulated step-down converter configured to maintain a predetermined voltage ratio across the first capacitor and the second capacitor,
    wherein an output power at the output node is based on a first partial power provided by the DC/DC converter and a second partial power provided by the CBC, and wherein a percentage of the output power provided by the second partial power is a second converted voltage divided by a first converted voltage.

2. The regulated partial power controlled converter of claim 1, wherein the first terminal of the DC/DC converter is connected to the output node, wherein the second terminal of the DC/DC converter is connected to the intermediate node, and wherein the first partial power provided by the DC/DC converter is provided by the first terminal.

3. The regulated partial power controlled converter of claim 1, wherein the first terminal of the DC/DC converter is connected to the intermediate node, and wherein the second terminal of the DC/DC converter is connected to the ground.

4. The regulated partial power controlled converter of claim 1, wherein a voltage at the intermediate node is above zero.

5. The regulated partial power controlled converter of claim 4, wherein the voltage at the intermediate node is half of the voltage of the output node.

6. The regulated partial power controlled converter of claim 4, wherein a capacitive value of the first capacitor is equal to a capacitive value of the second capacitor.

7. The regulated partial power controlled converter of claim 1, wherein the CBC is a charge pump.

8. The regulated partial power controlled converter of claim 1, wherein the CBC comprises a first switch, a second switch, a third switch, and a fourth switch connected in series, wherein the CBC further comprises a third capacitor connected at a first end between the first switch and the second switch and connected at a second end between the third switch and the fourth switch, wherein the first switch is connected to the output node, and wherein the fourth switch is connected to the ground.

9. The regulated partial power controlled converter of claim 8, wherein the CBC further comprises an inductor in series with the third capacitor.

10. The regulated partial power controlled converter of claim 1, wherein the DC/DC converter is a buck-boost converter.

11. The regulated partial power controlled converter of claim 1, wherein the DC/DC converter is a flyback converter.

12. The regulated partial power controlled converter of claim 1, further comprising a bus converter for providing isolation of the DC/DC converter and the CBC from an output of the regulated partial power controlled converter.

13. A method of regulated power conversion in a regulated partial power controlled converter, comprising:
    receiving, by a direct current (DC)/DC converter of the regulated partial power controlled converter, an input signal;
    providing, by the DC/DC converter, a first converted signal over a first path from a first terminal to an output node, the first converted signal different than the input signal;
    providing, by the DC/DC converter, a second converted signal over a second path from a second terminal to an intermediate node, the second path being independent of the first path;
    maintaining, by a charge balance circuit (CBC) connected to the output node, the intermediate node, and a ground of the regulated partial power controlled converter, a predetermined voltage ratio across a first capacitor and a second capacitor, wherein the first capacitor is connected to the intermediate node and directly connected to the ground, the second capacitor is connected between the output node and the intermediate node and the CBC is a regulated step-down converter with an efficiency of more than 98%;

providing a first partial power provided by the DC/DC converter; and providing a second partial power provided by the CBC, wherein an output power at the output node is based on the first partial power and the second partial power.

14. The method of claim 13, wherein the first terminal of the DC/DC converter is connected to the output node, wherein the second terminal of the DC/DC converter is connected to the intermediate node, and wherein the first partial power provided by the DC/DC converter is provided by the first terminal.

15. The method of claim 13, wherein the first terminal of the DC/DC converter is connected to the intermediate node, and wherein the second terminal of the DC/DC converter is connected to the ground.

16. The method of claim 13, wherein a voltage at the intermediate node is above zero.

17. The method of claim 13, wherein the CBC is a charge pump.

18. The method of claim 13, wherein the DC/DC converter is a buck-boost converter.

19. The method of claim 13, wherein the DC/DC converter is a flyback converter.

* * * * *